United States Patent
Cheng et al.

(10) Patent No.: US 12,213,074 B2
(45) Date of Patent: Jan. 28, 2025

(54) SECONDARY CELL DORMANCY USING DORMANCY PROFILE

(71) Applicant: QUALCOMM Incorporated, San Diego, CA (US)

(72) Inventors: Peng Cheng, Beijing (CN); Peter Pui Lok Ang, San Diego, CA (US); Huilin Xu, Temecula, CA (US); Prasad Reddy Kadiri, San Diego, CA (US); Linhai He, San Diego, CA (US); Arvind Vardarajan Santhanam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 382 days.

(21) Appl. No.: 17/754,264

(22) PCT Filed: Nov. 7, 2019

(86) PCT No.: PCT/CN2019/116147
§ 371 (c)(1),
(2) Date: Mar. 29, 2022

(87) PCT Pub. No.: WO2021/077468
PCT Pub. Date: Apr. 29, 2021

(65) Prior Publication Data
US 2022/0330155 A1  Oct. 13, 2022

(30) Foreign Application Priority Data
Oct. 22, 2019  (WO) ................ PCT/CN2019/112422

(51) Int. Cl.
*H04W 72/0453* (2023.01)
*H04W 52/02* (2009.01)

(52) U.S. Cl.
CPC ... *H04W 52/0235* (2013.01); *H04W 72/0453* (2013.01)

(58) Field of Classification Search
CPC ......... H04W 52/0219; H04W 52/0235; H04W 52/0238; H04W 52/143; H04W 52/145;
(Continued)

(56) References Cited

U.S. PATENT DOCUMENTS 9,999,042 B2 * 6/2018 Briggs .................. H04L 5/0071
10,721,720 B2   7/2020 Damnjanovic et al.
(Continued)

FOREIGN PATENT DOCUMENTS

CN    109496452 A    3/2019
CN    110035480 A    7/2019
(Continued)

OTHER PUBLICATIONS

International Search Report and Written Opinion—PCT/CN2019/112422—ISAEPO—Jul. 8, 2020 (200167WO1).
(Continued)

*Primary Examiner* — Jean A Gelin
(74) *Attorney, Agent, or Firm* — Harrity & Harrity, LLP

(57) ABSTRACT

Various aspects of the present disclosure generally relate to wireless communication. In some aspects, a user equipment may receive bandwidth part configuration information configuring a dormancy profile for a first bandwidth part of a plurality of bandwidth parts; communicate, on a second bandwidth part, a plurality of types of signaling; and communicate, on the first bandwidth part, a subset of the plurality of types of signaling, such that at least one type of signaling, of the plurality of types of signaling, is suppressed in accordance with the dormancy profile. Numerous other aspects are provided.

35 Claims, 10 Drawing Sheets

(58) Field of Classification Search
CPC ......... H04W 52/0245; H04W 72/0446; H04W 72/0453; H04W 72/20; H04W 72/23; H04W 72/231; H04W 72/232
USPC .......................................................... 370/311
See application file for complete search history.

(56) References Cited

U.S. PATENT DOCUMENTS

| | | | | |
|---|---|---|---|---|
| 2012/0281566 | A1* | 11/2012 | Pelletier ............ | H04W 72/1221 370/252 |
| 2014/0086161 | A1 | 3/2014 | Cai et al. | |
| 2014/0086173 | A1* | 3/2014 | Sadeghi ................ | H04W 68/02 370/328 |
| 2014/0198762 | A1* | 7/2014 | Yang ..................... | H04L 5/0037 370/329 |
| 2015/0110011 | A1* | 4/2015 | Wei ....................... | H04L 5/0053 370/329 |
| 2016/0050601 | A1* | 2/2016 | Jeong ................... | H04L 1/1861 455/436 |
| 2019/0021052 | A1 | 1/2019 | Kadiri et al. | |
| 2019/0124558 | A1 | 4/2019 | Ang et al. | |
| 2019/0253200 | A1* | 8/2019 | Salem ............... | H04W 74/0808 |
| 2019/0356446 | A1* | 11/2019 | Kim ...................... | H04L 5/0053 |
| 2020/0099981 | A1* | 3/2020 | Zhang ................ | H04N 21/6375 |
| 2020/0236677 | A1* | 7/2020 | Cui ....................... | H04W 16/14 |
| 2020/0275484 | A1* | 8/2020 | Xu .................... | H04W 72/1268 |
| 2021/0007101 | A1* | 1/2021 | Tooher ................. | H04W 24/08 |
| 2021/0167934 | A1* | 6/2021 | Fan ....................... | H04L 5/0098 |
| 2021/0377852 | A1* | 12/2021 | Zhou .................... | H04W 76/28 |
| 2022/0007365 | A1* | 1/2022 | Jung .................... | H04W 24/10 |
| 2022/0078771 | A1* | 3/2022 | Jang ................. | H04W 52/0219 |
| 2022/0104191 | A1* | 3/2022 | Xia ................... | H04W 72/0453 |
| 2022/0167445 | A1* | 5/2022 | Wang .................. | H04L 1/0025 |
| 2022/0330378 | A1* | 10/2022 | Seo ..................... | H04W 72/044 |
| 2024/0188113 | A1* | 6/2024 | Kou ....................... | H04B 7/01 |

FOREIGN PATENT DOCUMENTS

| | | |
|---|---|---|
| CN | 110035512 A | 7/2019 |
| CN | 110166215 A | 8/2019 |
| CN | 110351854 A | 10/2019 |
| EP | 3570613 A1 | 11/2019 |
| WO | 2015116353 | 8/2015 |

OTHER PUBLICATIONS

International Search Report and Written Opinion—PCT/CN2019/116147—ISA/EPO—Jul. 21, 2020 (200167WO2).
OPPO: "Introduction of Dormancy Behavior in NR", 3GPP TSG-RAN WG2 Meeting #107bis, R2-1913942, ChongQing, China, Oct. 14-18, 2019, Oct. 19, 2019 (Oct. 19, 2019), pp. 1-4, 4 pages.
QUALCOMM Incorporated: "Fast SCG and SCell Activation", 3GPP TSG-RAN WG1 #98, R1-1909287, 3GPP, Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019, pp. 1-11, XP051765892, 2.1 Fast SCell Activation/Deactivation, 2.2 SCell Dormancy, 2.3 Usage of fast SCell activation and dormant BWP, 2.2.1 Dormant BWP for SCell, line 3-line 5.
QUALCOMM Incorporated: "Open Issues on BWP", R1-1718580 Open Issues on BWP, 3rd Generation Partnership-Project, Mobile Competence Centre, 650 Route Des Lucioles, F-06921 Sophia-Antipolis Cedex, France, vol. RAN WG1, No. Prague, Czech Republic, Oct. 9, 2017-Oct. 13, 2017, Oct. 8, 2017, XP051341760, 8 pages.
Supplementary European Search Report—EP19950028—Search Authority—The Hague—Oct. 26, 2023 (200167EP).
QUALCOMM Incorporated: "Fast SCell Activation and SCell Dormancy", 3GPP TSG-RAN WG1 #98bis, R1-1911139, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, 18 Pages, pp. 1, 5, 10-12.

* cited by examiner

SECONDARY CELL DORMANCY USING DORMANCY PROFILE

CROSS-REFERENCE TO RELATED APPLICATIONS

This Application is a 371 national stage of PCT Application PCT/CN2019/116147 filed on Nov. 7, 2019, entitled "SECONDARY CELL DORMANCY USING DORMANCY PROFILE," which claims priority to Patent Cooperation Treaty (PCT) Application No. PCT/CN2019/112422, filed on Oct. 22, 2019, entitled "SECONDARY CELL DORMANCY USING DORMANCY PROFILE," both of which are are hereby expressly incorporated by reference herein.

FIELD OF THE DISCLOSURE

Aspects of the present disclosure generally relate to wireless communication and to techniques and apparatuses for secondary cell dormancy using dormancy profile.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving bandwidth part configuration information configuring a dormancy profile for a first bandwidth part of a plurality of bandwidth parts; communicating, on a second bandwidth part, a plurality of types of signaling; and communicating on the first bandwidth part a subset of the plurality of types of signaling, such that at least one type of signaling, of the plurality of types of signaling, is suppressed in accordance with the dormancy profile.

In some aspects, a UE for wireless communication may include memory and one or more processors operatively coupled to the memory. The memory and the one or more processors may be configured to receive bandwidth part configuration information configuring a dormancy profile for a first bandwidth part of a plurality of bandwidth parts; communicate, on a second bandwidth part, a plurality of types of signaling; and communicate on the first bandwidth part a subset of the plurality of types of signaling, such that at least one type of signaling, of the plurality of types of signaling, is suppressed in accordance with the dormancy profile.

In some aspects, a non-transitory computer-readable medium may store one or more instructions for wireless communication. The one or more instructions, when executed by one or more processors of a UE, may cause the one or more processors to receive bandwidth part configuration information configuring a dormancy profile for a first bandwidth part of a plurality of bandwidth parts; communicate, on a second bandwidth part, a plurality of types of signaling; and communicate on the first bandwidth part a subset of the plurality of types of signaling, such that at least one type of signaling, of the plurality of types of signaling, is suppressed in accordance with the dormancy profile.

In some aspects, an apparatus for wireless communication may include means for receiving bandwidth part configuration information configuring a dormancy profile for a first bandwidth part of a plurality of bandwidth parts; means for communicating, on a second bandwidth part, a plurality of types of signaling; and means for communicating on the first bandwidth part a subset of the plurality of types of signaling, such that at least one type of signaling, of the plurality of types of signaling, is suppressed in accordance with the dormancy profile.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
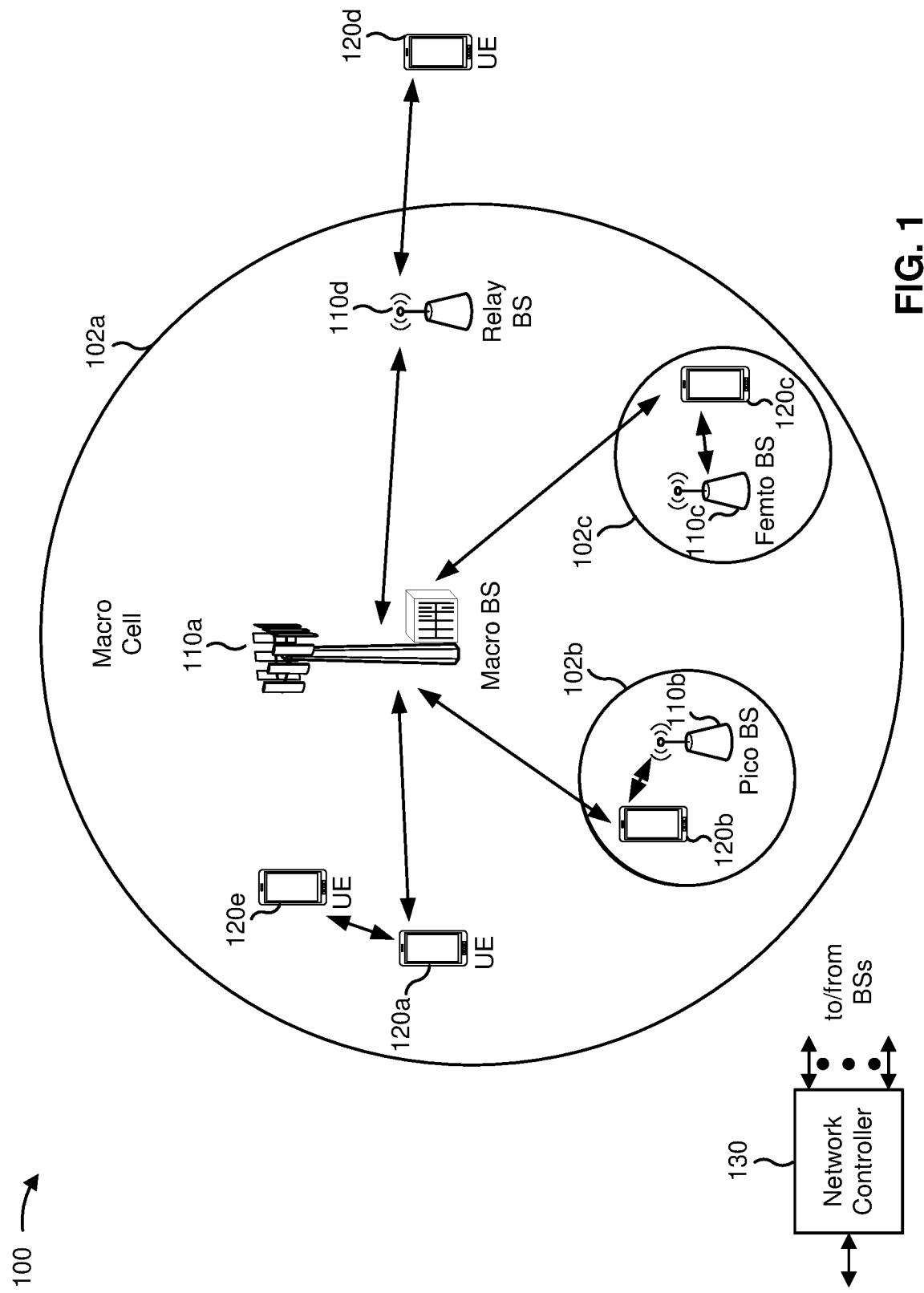
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
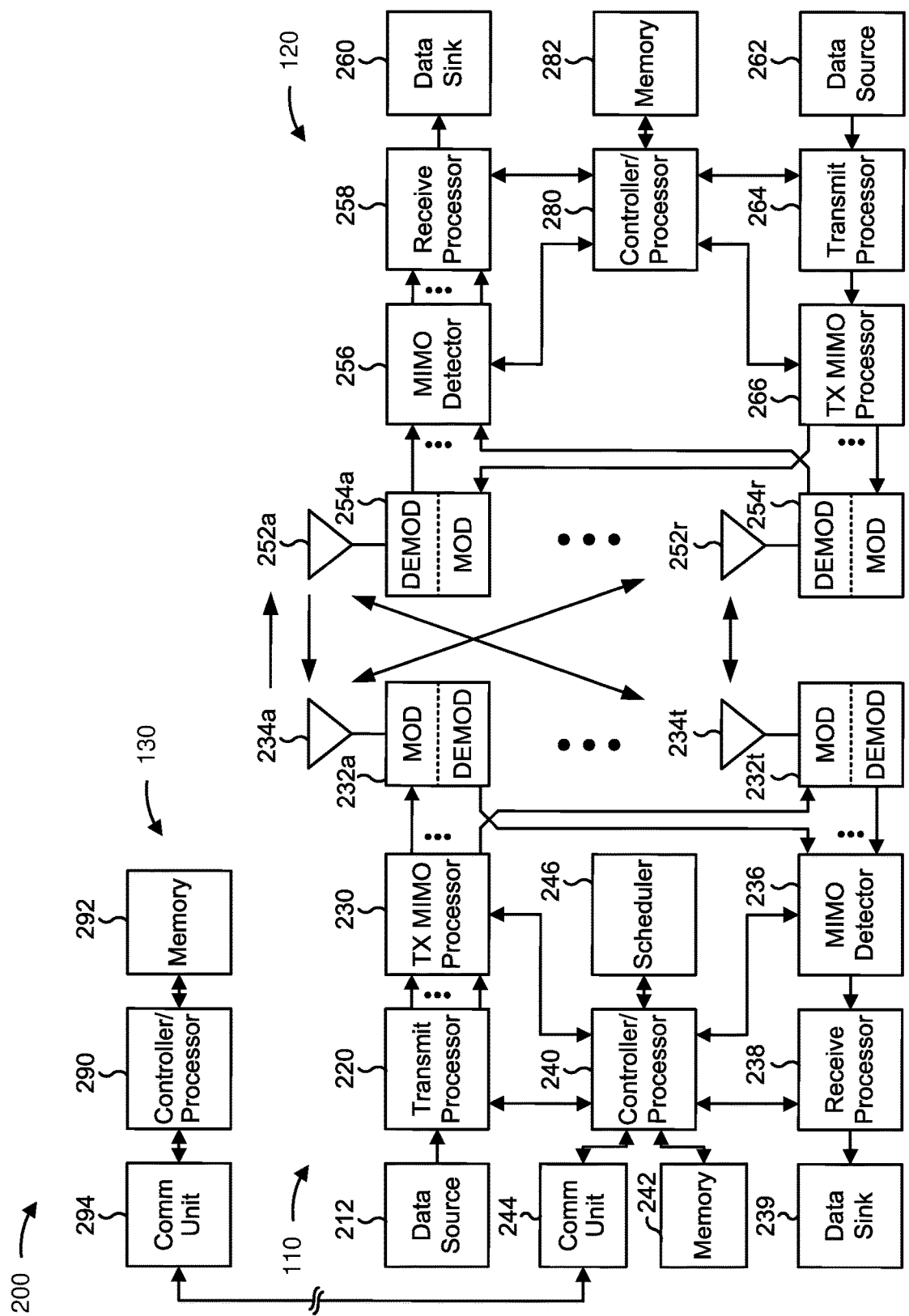
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with secondary cell dormancy using dormancy profile, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for receiving bandwidth part configuration information configuring a dormancy profile for a first bandwidth part of a plurality of bandwidth parts, means for communicating, on a second bandwidth part, a plurality of types of signaling, means for communicating on the first bandwidth part a subset of the plurality of types of signaling, such that at least one type of signaling, of the plurality of types of signaling, is suppressed in accordance with the dormancy profile, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
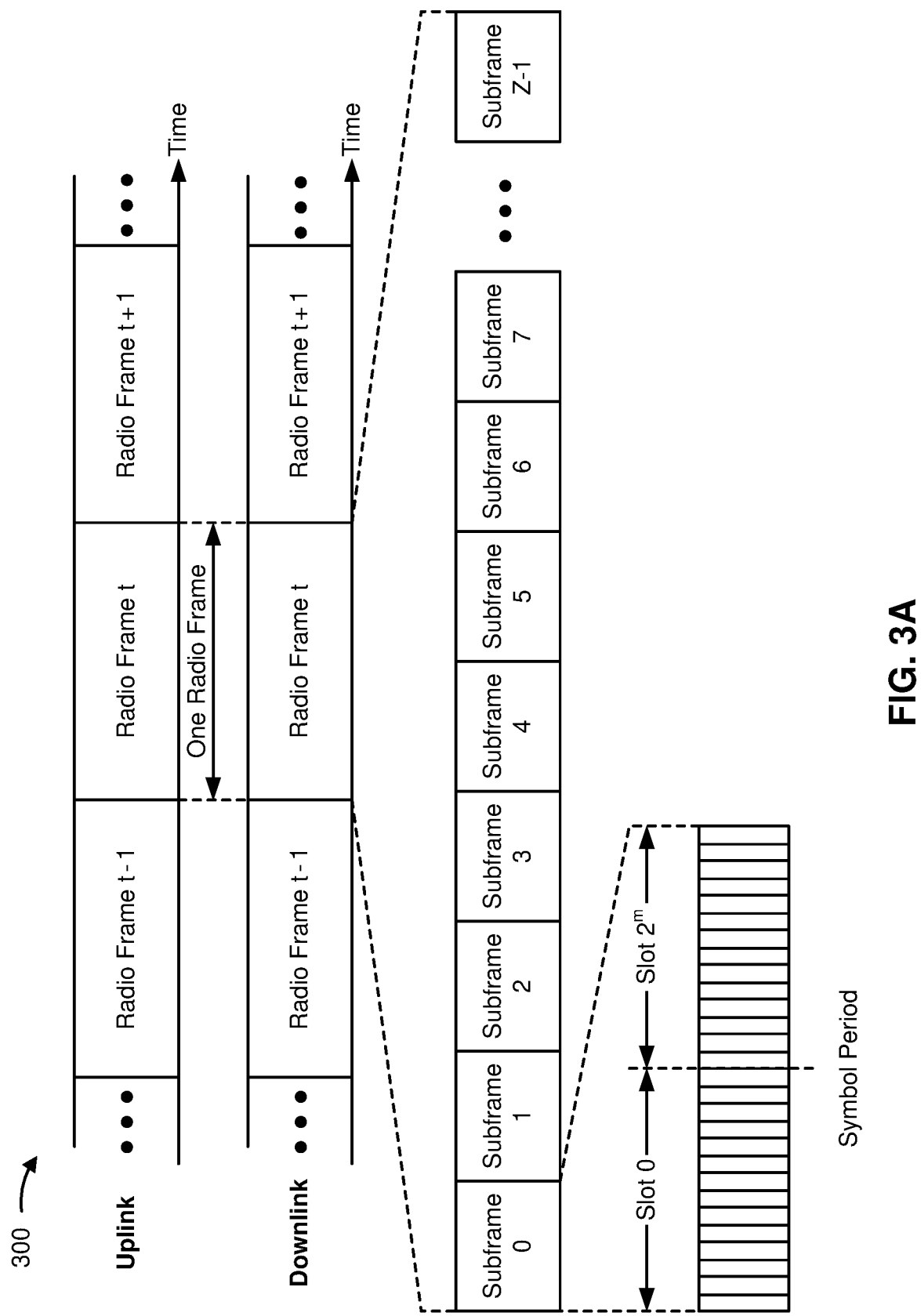
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
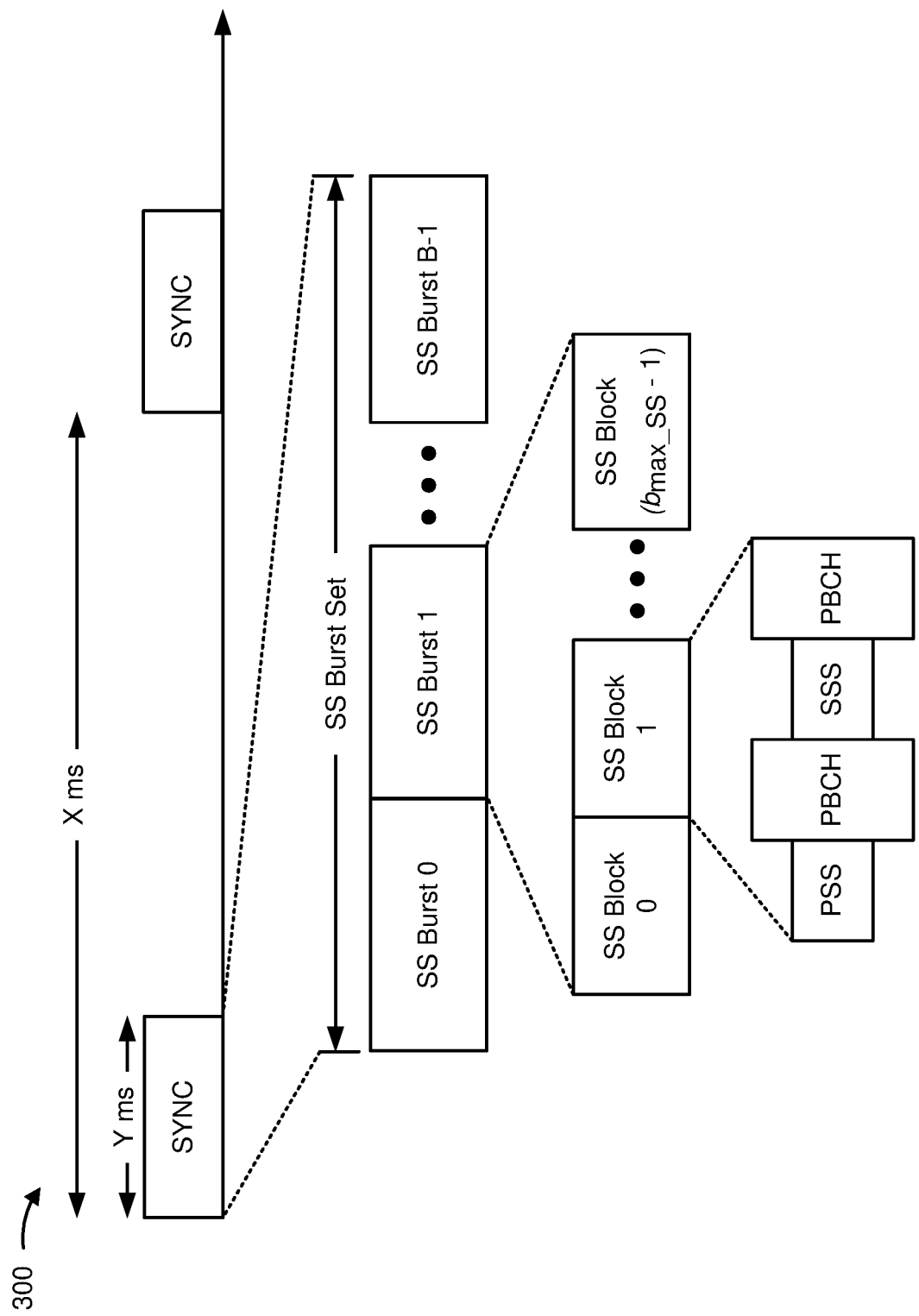
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
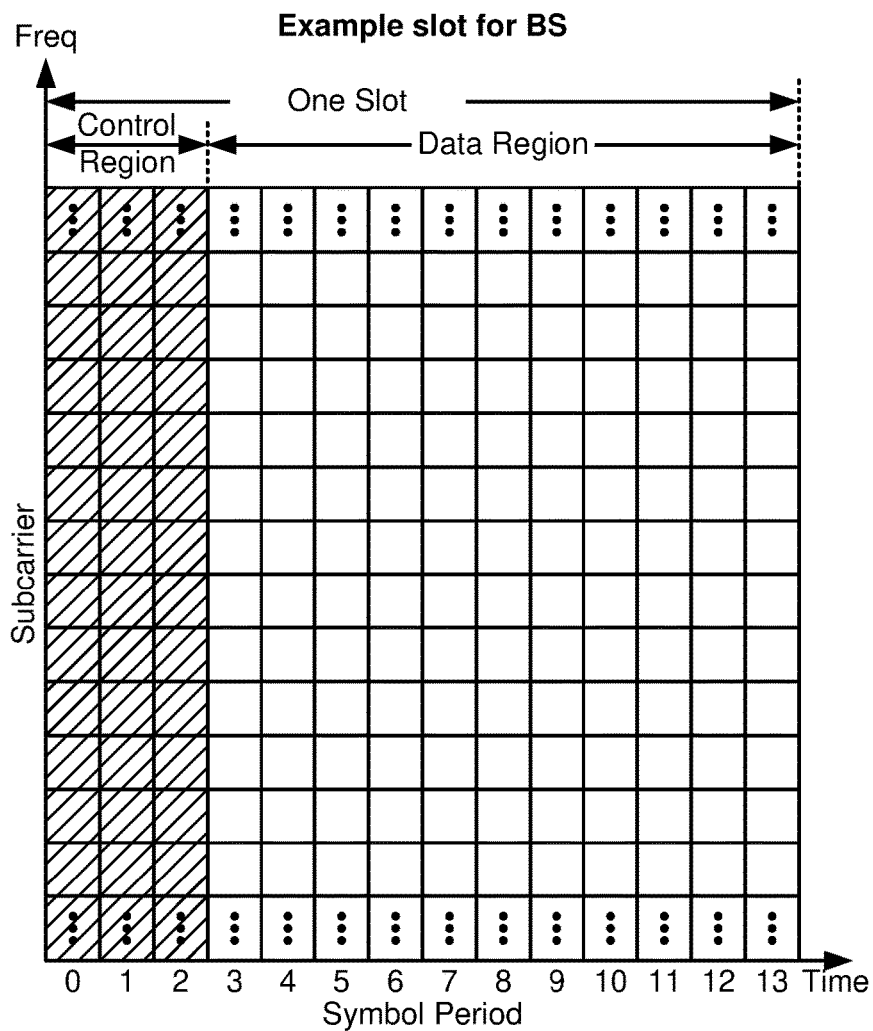
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
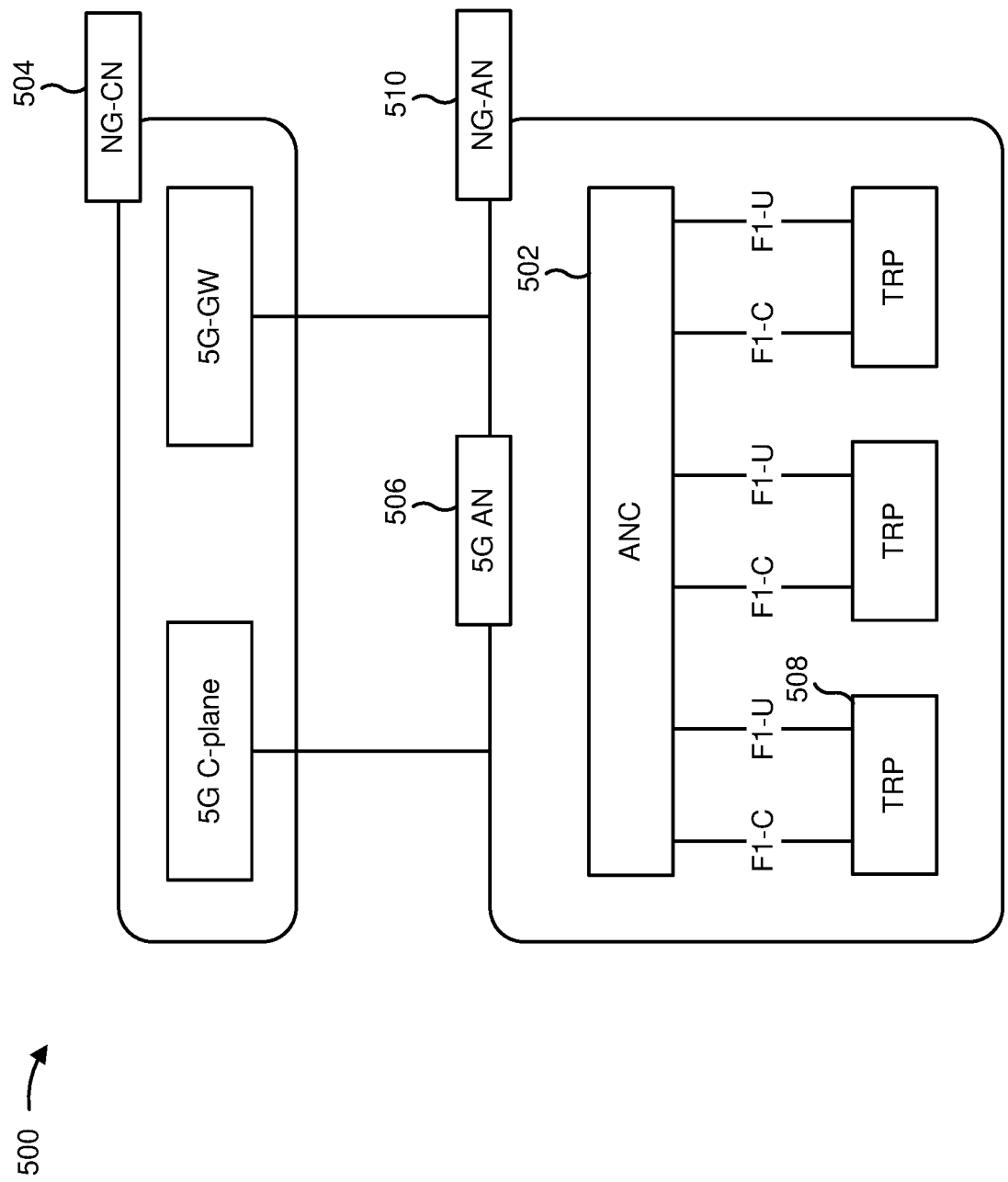
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
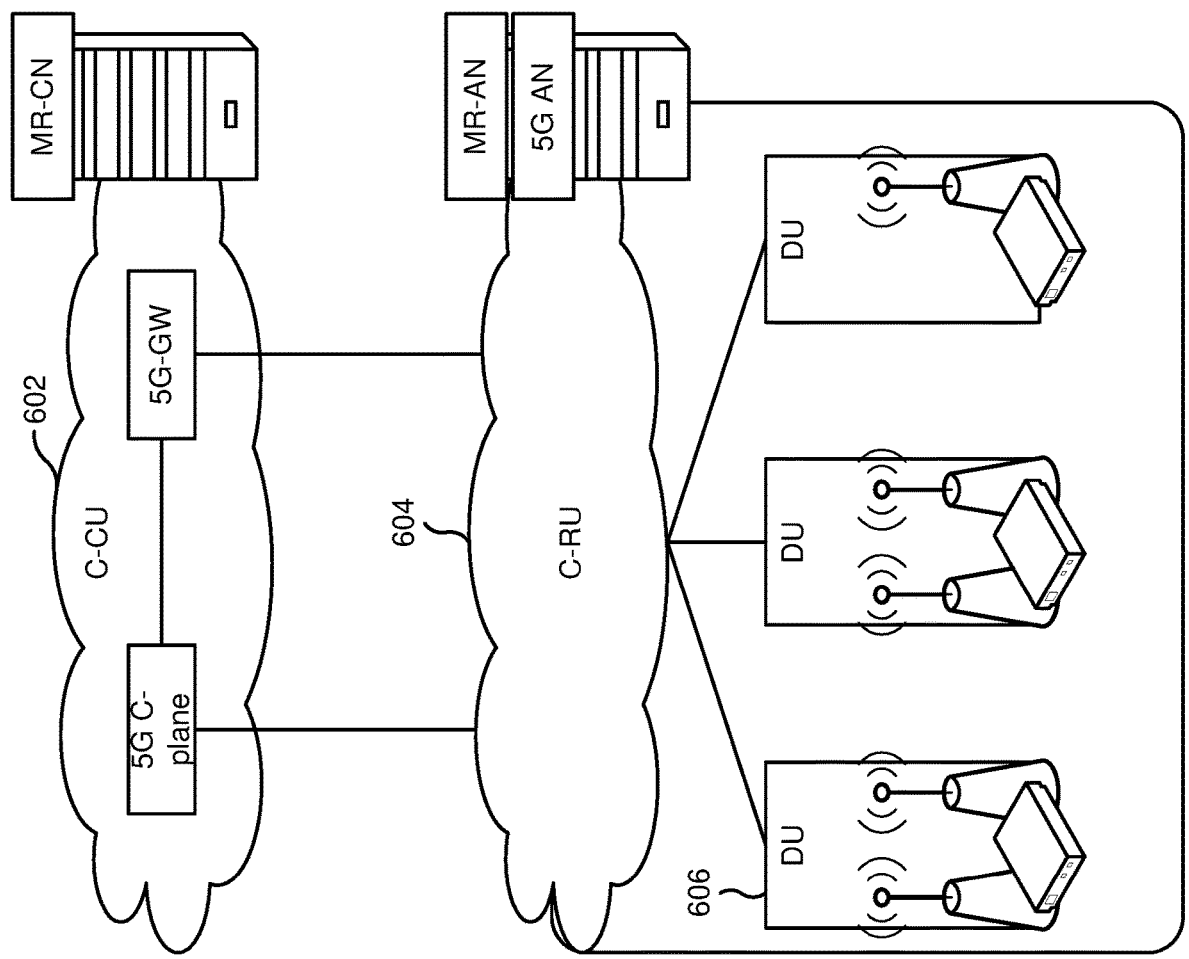
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, a UE and a BS may communicate using one or more bandwidth parts. By dividing a communication bandwidth into bandwidth parts, the BS may support UEs without a capability of monitoring the whole communication bandwidth. Additionally, the UEs may monitor a subset of bandwidth parts to achieve reduced power consumption relative to monitoring a whole communication bandwidth. Furthermore, the BS and the UE may configure parameters on a per-bandwidth part basis, which may enable optimization of communication for different use cases.

Some aspects described herein provide a dormancy profile to define a dormancy state or dormancy behavior for a bandwidth part associated with a secondary cell. For example, a BS may configure a dormant bandwidth part for the secondary cell and, on the dormant bandwidth part, some types of communication functionalities may be configured and other types of communication functionalities may not be configured, thereby achieving power savings. For example, a BS may configure channel state information (CSI) communication, radio resource management (RRM) communication, and/or the like, but may forgo configuring physical downlink control channel (PDCCH) monitoring. In this case, the UE may perform CSI communication, RRM communication, and/or the like on a dormant bandwidth part in accordance with a dormancy profile and may forgo PDCCH monitoring on the dormant bandwidth part. Further, on another bandwidth part that is configured with a non-dormancy profile (e.g., for a primary cell), the UE may perform the PDCCH monitoring. In this way, the UE reduces a power utilization relative to maintaining an active state on each bandwidth part.

In some aspects, a one-bit downlink control information (DCI) indication to trigger a switch from dormancy behavior to non-dormancy behavior may be introduced for each secondary cell group. Thus, which bandwidth part is a dormant bandwidth part may be explicitly configured in radio resource control (RRC) signaling. And, a network (e.g., the BS) and the UE may be aligned with regard to which bandwidth part the UE is to switch to from a dormant bandwidth part.

In some aspects, the one-bit DCI indication indicating a switch from dormancy behavior to non-dormancy behavior is introduced for each secondary cell group. Thus, the one-bit DCI may not indicate which bandwidth part the UE is to switch to. As a result, the dormant bandwidth part may be explicitly indicated in RRC signaling. And, the UE may switch from a dormant bandwidth part to a first active bandwidth part (if configured by RRC) or a last active bandwidth part upon reception of the indication to transition from dormancy behavior to non-dormancy behavior. In some aspects, based at least in part on using a physical uplink control channel (PUCCH) of a primary secondary cell for CSI reporting during secondary cell group suspension, a dormancy secondary cell may follow a primary secondary cell discontinuous reception (DRX) for CSI/RRM measurement report triggering.

Figure 7A:
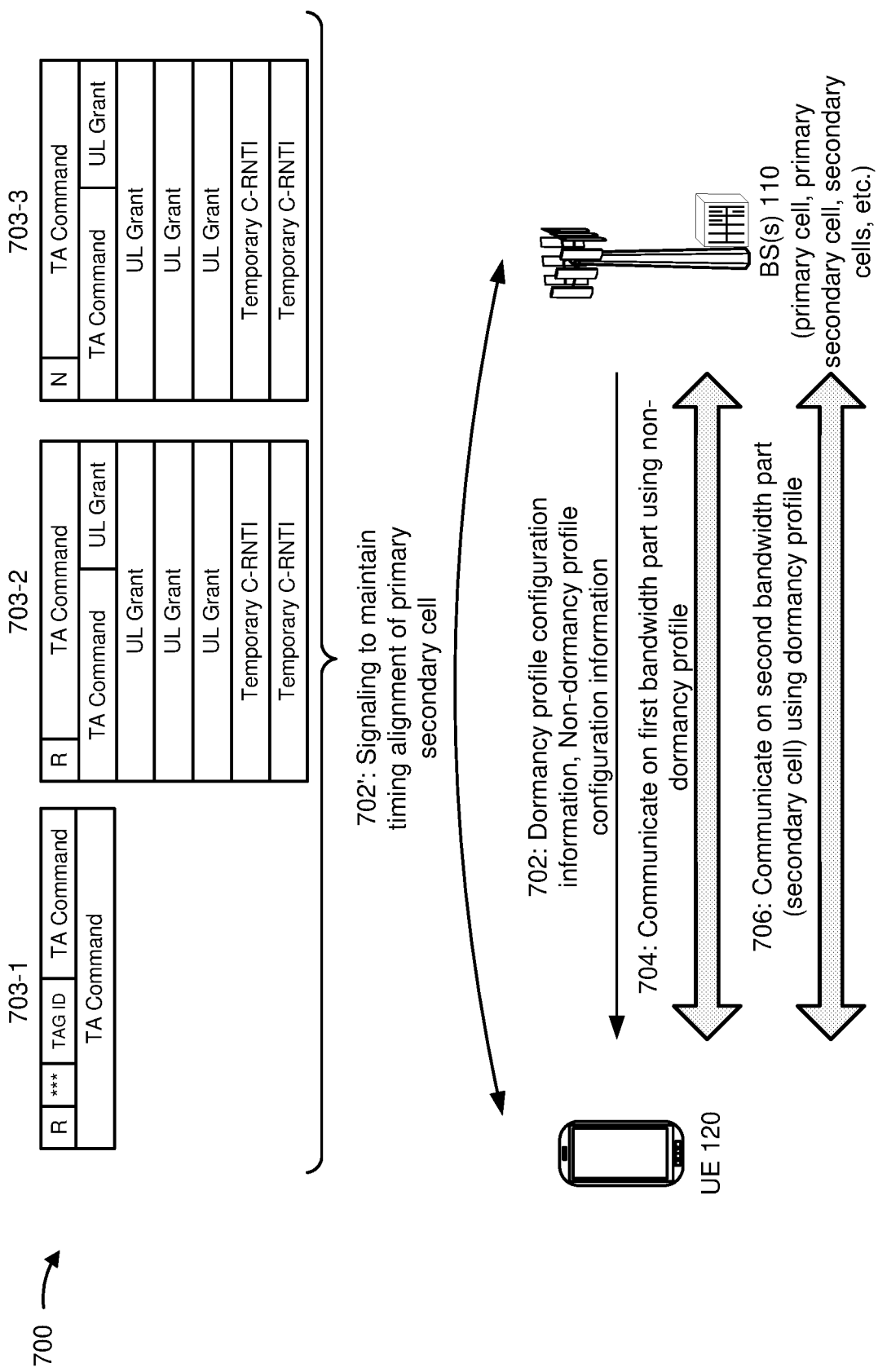
FIGS. 7A and 7B are diagrams illustrating an example of secondary cell dormancy using dormancy profile, in accordance with various aspects of the present disclosure.
Figure 7B:
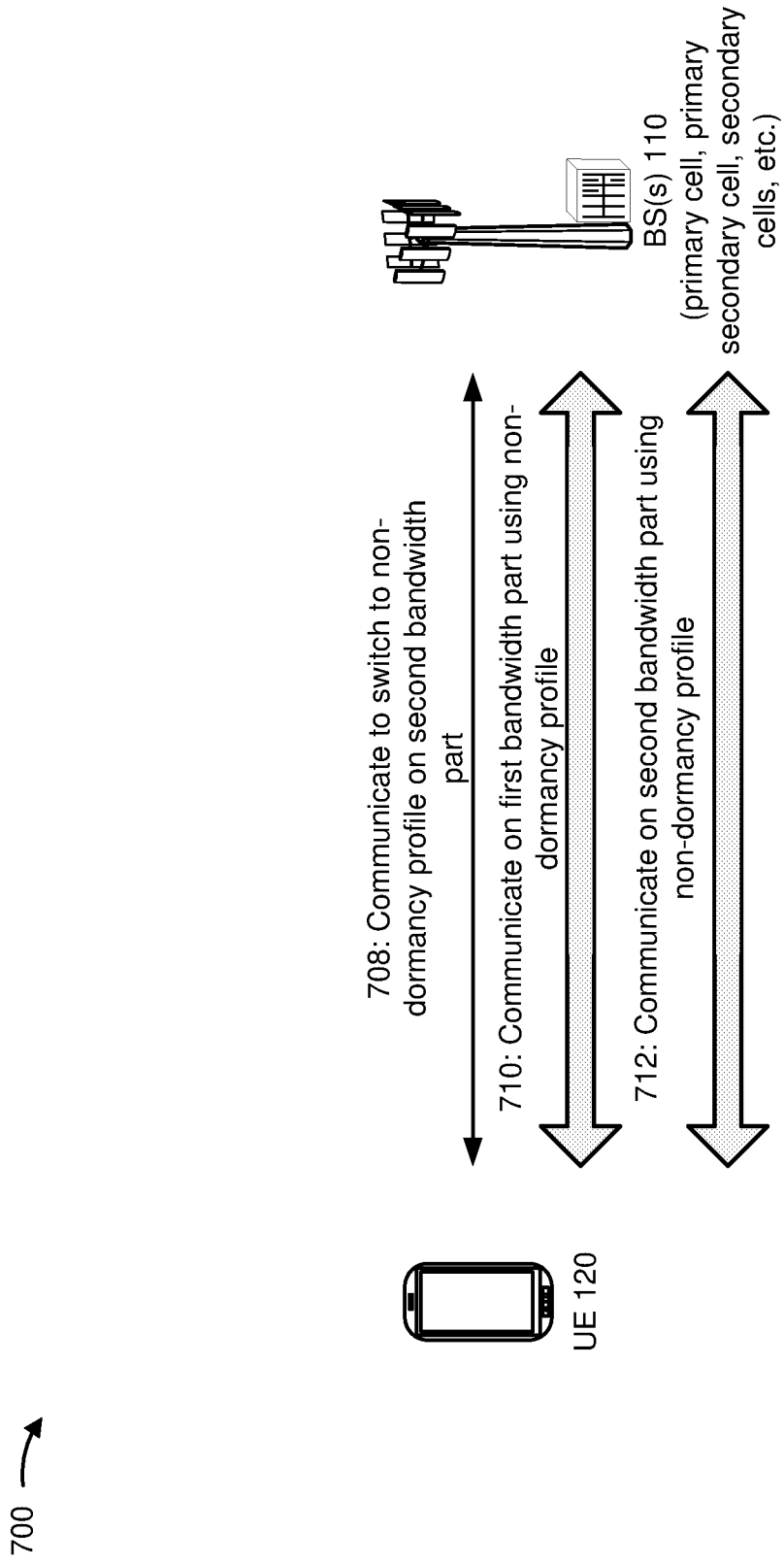

FIGS. 7A and 7B are diagrams illustrating an example 700 of secondary cell dormancy using dormancy profile, in accordance with various aspects of the present disclosure. As shown in FIGS. 7A and 7B, example 700 includes a BS 110 and a UE 120.

As further shown in FIG. 7A, and by reference number 702, UE 120 may receive dormancy profile configuration information and/or non-dormancy profile configuration information. A dormancy profile may include a configuration parameter set with parameters for dormancy behavior.

In some aspects, UE 120 may receive information identifying a dormancy profile in a bandwidth part configuration message. For example, during initial bandwidth part configuration or during bandwidth part reconfiguration, UE 120 may receive a dormancy profile defining a set of parameters for a bandwidth part, such that the bandwidth part is associated with a dormant state.

In some aspects, the dormancy profile may relate to a secondary cell. For example, UE 120 may receive information identifying the dormancy profile for a secondary cell associated with a particular bandwidth part. In some aspects, UE 120 may receive only a dormancy profile for the secondary cell, and the secondary cell may operate in accordance with the dormancy state or dormancy behavior until a reconfiguration. In this case, the bandwidth part may be defined as a dormant bandwidth part based at least in part on only having a dormancy profile. Alternatively, UE 120 may receive a dormancy profile and a non-dormancy profile (e.g., a set of parameters for the bandwidth part, such that the bandwidth part is not associated with the dormant state). In this case, UE 120 may receive signaling (e.g., layer 1 (L1) signaling) indicating whether to use the dormancy profile or the non-dormancy profile. In this way, BS 110 and UE 120 may enable dynamic state switching, which may enable further optimization of use of network resources, consumption of power resources, and/or the like.

In some aspects, the dormancy profile may be a radio resource control (RRC)-configured downlink dormancy profile. For example, BS 110 may transmit the dormancy profile using RRC signaling and may include a particular type of PDCCH configuration parameter. In this case, BS 110 may provide a dormancy profile in which PDCCH monitoring is not configured. Additionally, or alternatively, BS 110 may provide a dormancy profile in which PDCCH monitoring is configured, but no control resource set (CORESET) is configured or no search space is configured. In some aspects, the dormancy profile may include an optionally configured parameter. For example, BS 110 may selectively configure physical downlink shared channel (PDSCH) monitoring, RRM communication, beam failure detection, and/or the like. Additionally, or alternatively, BS 110 may not configure, for example, semi-persistent scheduling for a bandwidth part on which a dormancy profile is being used.

In some aspects, the dormancy profile may be an RRC-configured uplink dormancy profile. For example, BS 110 may provide information identifying a dormancy profile with a particular physical uplink control channel (PUCCH) configuration parameter. In this case, BS 110 may configure PUCCH for CSI reporting in a PUCCH-secondary cell (PUCCH-S-Cell), and not for PUCCH transmission in other secondary cells of a secondary cell group. Additionally, or alternatively, BS 110 may provide a physical uplink shared channel (PUSCH) configuration in the dormancy profile. In contrast, BS 110 may forgo providing a random access channel (RACH) configuration, a configured grant transmission configuration, and/or the like. In some aspects, BS 110 may provide a sounding reference signal (SRS) configuration. For example, BS 110 may forgo configuring the SRS in a non-PUCCH-S-Cell, but may optionally configure the SRS in the PUCCH-S-Cell.

In some aspects, UE 120 may receive a dormancy profile relating to a secondary cell group. For example, UE 120 may receive a dormancy profile with parameters set for secondary cell operation, primary secondary cell operation, and/or the like. In this case, one or more BSs 110 may operate a secondary cell group in accordance with the dormancy profile when a primary secondary cell of the secondary cell group is communicating with UE 120 in accordance with the dormancy profile. In contrast, when the primary secondary cell is activated to a non-dormant state, the one or more BSs 110 may activate secondary cells of the secondary cell group. In some aspects, for an uplink dormancy profile for secondary cell groups, UE 120 may receive parameters indicating that PUCCH communication is configured for CSI reporting or scheduling request transmission, that RACH is optionally configured, and/or that SRS transmission is optionally configured.

As shown by reference number 702', in connection with the dormancy profile and for secondary cell group operation, UE 120 may maintain a timing alignment of a primary secondary cell in a dormancy profile in connection with an activation of the non-dormancy profile. For example, UE 120 may maintain the timing alignment to reduce a latency associated with a RACH procedure when switching from a dormancy profile to a non-dormancy profile. In some aspects, UE 120 may receive (e.g., from an MN BS 110) a timing advance command (TAC) MAC CE to determine the timing alignment. For example, UE 120 may receive a TAC MAC CE when a dormancy profile is active to indicate a timing alignment of the primary secondary cell. In this case, as shown by reference number 703-1, UE 120 may receive a timing alignment command that includes a reserve bit, a master cell group (MCG)/secondary cell group (SCG) identifier (shown as \*\*\*) bit, a timing alignment group identifier, and a 12 bit timing advance command. In this case, UE 120 may use the MCG/SCG identifier bit to determine whether the TAC MAC CE is to apply for an MCG or an SCG. In some aspects, BS 110 may configure a primary secondary cell with a long-cycle connected discontinuous reception (C-DRX) mode and cause each secondary cell in a secondary cell group to enter a dormancy state.

In some aspects, UE 120 may receive radio resource control (RRC) signaling from an MN BS 110. For example, UE 120 may receive RRC signaling conveying a timing alignment of a primary secondary cell, a PUCCH secondary cell, and/or the like of an SCG. In this case, BS 110 may determine the timing alignment based on a periodic or semi-persistent channel state information (CSI) reporting in a PUCCH configured in an uplink dormancy profile of a primary secondary cell or a PUCCH secondary cell. In some aspects, the RRC signaling may include information indicating whether the RRC signaling is for an MCG or an SCG, a timing alignment group identifier, a timing advance command, an indicator of a timing alignment timer for a suspended SCG, and/or the like.

Additionally, or alternatively, UE 120 may transmit a physical RACH (PRACH) message in connection with an uplink dormancy profile of a primary secondary cell. In this case, UE 120 may receive, as a response from BS 110 (e.g., the primary secondary cell), a RACH response (RAR) message that includes a timing alignment indicator in a downlink dormancy profile for the primary secondary cell. In some aspects, after transmitting a preamble of the PRACH message, which may activate a primary secondary cell, UE 120 may monitor for the RAR message in connection with a downlink dormancy profile for a particular duration (e.g., a radio resource control configured duration). Additionally, or alternatively, UE 120 may activate the primary secondary cell using RRC signaling, such as a UE assistance information message, which may be a 1-bit request indication that UE 120 requests to activate a secondary cell group.

In some aspects, the RAR message may use a particular format to provide the timing alignment indicator. For example, as shown by reference numbers 703-2 and 703-3, BS 110 may use a legacy RAR MAC CE or a dedicated RAR MAC CE (e.g., which may include a reserved bit, N, to indicate whether the timing advance command is of a primary PUCCH group or a secondary PUCCH group of a secondary cell group), respectively, to convey a timing advance command identifying a timing alignment indicator. In this case, when a timing alignment timer of a PUCCH secondary cell expires, UE 120 may release a PUCCH configuration of the PUCCH secondary cell and may report a periodic or semi-persistent channel state information in a PUCCH of a primary secondary cell.

As further shown in FIG. 7A, and by reference numbers 704 and 706, UE 120 may communicate on a first bandwidth part using a non-dormancy profile and a second bandwidth part using a dormancy profile. For example, with respect to the second bandwidth part and on a downlink, UE 120 may forgo PDCCH monitoring and semi-persistent scheduling communication. In contrast, UE 120 may perform CSI communication, RRM communication, beam management communication, and/or the like, and may optionally perform beam failure detection on the second bandwidth part and on a downlink. Similarly, with respect to the second bandwidth part and on an uplink, UE 120 may report a periodic or semi-persistent CSI message (e.g., on a PUCCH of a primary cell for secondary cells of the primary cell's PUCCH group and/or on a PUCCH-S-Cell for second cells of a secondary PUCCH group).

In contrast, UE 120 may forgo periodic SRS communication, PRACH transmission, scheduling request transmission, and configured grant transmission. Additionally, or alternatively, UE 120 may stop a timing advance timer when using a dormant state uplink bandwidth part. Additionally, or alternatively, UE 120 may monitor a primary cell when using the second bandwidth part in a dormant state. For example, UE 120 may monitor for a cross-carrier DCI associated with indicating that UE 120 is to switch from using the dormancy profile for the second bandwidth part to using a non-dormancy profile for the second bandwidth part.

In some aspects, for secondary cell group operation, UE 120 may perform CSI reporting in accordance with the dormancy profile. For example, for a dormancy profile for secondary cell group operation, UE 120 may report a periodic or semi-persistent CSI in a PUCCH of a primary cell (e.g., for secondary cells of the primary cell's PUCCH group) and/or in a PUCCH of a secondary cell (e.g., for secondary cells of the secondary cell's PUCCH group). Additionally, or alternatively, UE 120 may transmit RRM measurements to BS 110 (e.g., to a master node (MN)) to enable RRM operations.

In some aspects, for secondary cell group operation, UE 120 may transmit and/or receive activation signaling in connection with a dormancy profile. For example, UE 120 may receive signaling indicating that UE 120 is to activate a non-dormancy profile, as shown in FIG. 7B, and by reference number 708. For example, UE 120 may receive a cross-cell group DCI from a primary cell indicating that UE 120 is to switch from the dormancy profile to a non-dormancy profile for a primary secondary cell associated with the second bandwidth part. In this case, UE 120 may switch to using the non-dormancy profile and may communicate on both the first bandwidth part and the second bandwidth part using non-dormancy profiles, as shown by reference numbers 710 and 712.

Additionally, or alternatively, UE 120 may receive a cross-cell group DCI indicating that UE 120 is to switch to using the non-dormancy profile for secondary cells of a secondary cell group. Additionally, or alternatively, UE 120 may receive a cross-cell group DCI indicating a switch to using the dormancy profile for a primary secondary cell and a cross-carrier DCI indicating that UE 120 is to use the dormancy profile for secondary cells of a secondary cell group.

In some aspects, UE 120 may receive an RRC message triggering a switch between a dormancy profile (e.g., an associated dormant state) and a non-dormancy profile (e.g., an associated non-dormant state). For example, UE 120 may receive, from BS 110, an RRC reconfiguration message from a primary cell indicating that UE 120 is to switch from using a dormancy profile to using a non-dormancy profile for a primary secondary cell. Additionally, or alternatively, UE 120 may receive an RRC reconfiguration message indicating that UE 120 is to switch to using the non-dormancy profile for secondary cells of a secondary cell group. Additionally, or alternatively, UE 120 may receive an RRC reconfiguration message indicating that UE 120 is to switch to using a non-dormancy profile for a primary secondary cell and may receive a cross-carrier DCI indicating that UE 120 is to switch to using the non-dormancy profile for secondary cells of a secondary cell group.

In some aspects, for secondary cell group operation, UE 120 may transmit activation signaling to activate a cell. For example, when UE 120 is to switch to using a non-dormancy profile for a primary secondary cell, UE 120 may transmit an activation signal to BS 110 to cause BS 110 to activate the primary secondary cell. In this case, UE 120 may transmit the activation signal via a medium access control (MAC) control element (MAC CE) in an uplink packet to a master node (MN) UE 120. Additionally, or alternatively, UE 120 may transmit the activation signal, to a primary secondary cell BS 110, via a scheduling request of an uplink dormancy profile configured PUCCH, via a dedicated RACH configured in the uplink dormancy profile, and/or the like. In this case, the dedicated RACH may be a contention-free RACH of a preamble message or a RACH resource configured in an uplink dormancy profile for the primary secondary cell. In some aspects, BS 110 may forgo transmitting a RACH response on, for example, a PDCCH, as UE 120 may not be monitoring the PDCCH.

In some aspects, UE 120 may start monitoring for the RACH response based at least in part on transmitting activation signaling, thereby enabling completion of a RACH procedure. For example, BS 110 (e.g., an MN) may receive a RACH preamble requesting activation of a primary secondary cell and may transmit an activation response to UE 120 (e.g., a secondary node (SN)) via inter-node RRC signaling. In this case, if UE 120 does not receive a RACH response within a threshold amount of time, UE 120 may retransmit the activation signaling (e.g., via a preamble message).

As indicated above, FIGS. 7A and 7B are provided as examples. Other examples may differ from what is described with respect to FIGS. 7A and 7B.

Figure 8:
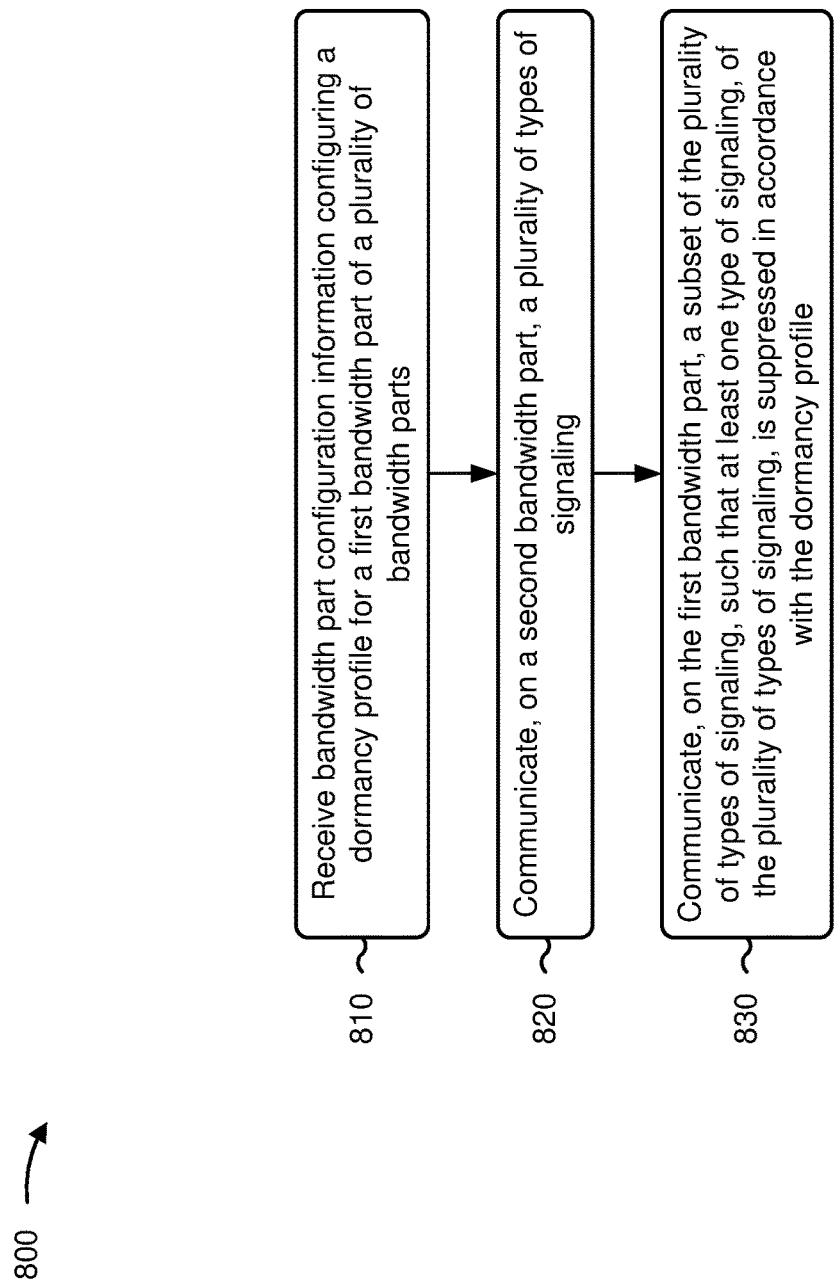
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with secondary cell dormancy using a dormancy profile.

As shown in FIG. 8, in some aspects, process 800 may include receiving bandwidth part configuration information configuring a dormancy profile for a first bandwidth part of a plurality of bandwidth parts (block 810). For example, the UE (e.g., using antenna 252, DEMOD 254, MIMO detector 256, receive processor 258, controller/processor 280, and/or the like) may receive bandwidth part configuration information configuring a dormancy profile for a first bandwidth part of a plurality of bandwidth parts, as described above.

As further shown in FIG. 8, in some aspects, process 800 may include communicating, on a second bandwidth part, a plurality of types of signaling (block 820). For example, the UE (e.g., using antenna 252, DEMOD 254, MIMO detector 256, receive processor 258, controller/processor 280, transmit processor 264, TX MIMO processor 266, MOD 254, antenna 252, and/or the like) may communicate, on a second bandwidth part, a plurality of types of signaling, as described above.

As further shown in FIG. 8, in some aspects, process 800 may include communicating, on the first bandwidth part, a subset of the plurality of types of signaling, such that at least one type of signaling, of the plurality of types of signaling, is suppressed in accordance with the dormancy profile (block 830). For example, the UE (e.g., using antenna 252, DEMOD 254, MIMO detector 256, receive processor 258, controller/processor 280, transmit processor 264, TX MIMO processor 266, MOD 254, antenna 252, and/or the like) may communicate, on the first bandwidth part, a subset of the plurality of types of signaling, such that at least one type of signaling, of the plurality of types of signaling, is suppressed in accordance with the dormancy profile, as described above.

Process 800 may include additional aspects, such as any single aspect or any combination of aspects described below and/or in connection with one or more other processes described elsewhere herein.

In a first aspect, process 800 includes receiving a non-dormancy profile for the first bandwidth part, and communicating on the first bandwidth part includes communicating on the first bandwidth part such that the at least one type of signaling is suppressed at a first time when the dormancy profile is active; and communicating on the first bandwidth part such that the at least one type of signaling is not suppressed at a second time when the non-dormancy profile is active.

In a second aspect, alone or in combination with the first aspect, the at least one type of signaling is physical downlink control channel (PDCCH) signaling, and the dormancy profile, with respect to the PDCCH signaling, is at least one of: not configured for PDCCH signaling, not configured with a control resource set for PDCCH signaling, or not configured with a search space for PDCCH signaling.

In a third aspect, alone or in combination with one or more of the first and second aspects, the dormancy profile is a downlink dormancy profile and, with respect to the plurality of types of signaling, the dormancy profile includes at least one of: a physical downlink shared channel configuration, a channel state information configuration for at least one secondary cell, a beam management configuration for the at least one secondary cell, a radio resource management configuration for the at least one secondary cell, a semi-persistent scheduling configuration for the at least one secondary cell, or a beam failure detection and beam failure recovery configuration for the at least one secondary cell.

In a fourth aspect, alone or in combination with one or more of the first through third aspects, the dormancy profile is an uplink dormancy profile and, with respect to the plurality of types of signaling, the dormancy profile includes at least one of a physical uplink control channel (PUCCH) configuration for channel state information reporting in a PUCCH secondary cell, a physical uplink shared channel configuration, a random access channel configuration in a subset of secondary cells, or a sounding reference signal configuration at least in the PUCCH secondary cell.

In a fifth aspect, alone or in combination with one or more of the first through fourth aspects, communicating on the first bandwidth part includes at least one of: forgoing monitoring of a physical downlink control channel, forgoing semi-persistent scheduling-based communication, performing channel state information signaling, selectively performing radio resource management signaling, selectively performing a beam management procedure, or selectively performing beam failure detection and beam failure recovery.

In a sixth aspect, alone or in combination with one or more of the first through fifth aspects, communicating on the first bandwidth part includes at least one of: monitoring, on a primary cell, for a cross-carrier downlink control information indicating a switch from the dormancy profile to a non-dormancy profile, or switching to the non-dormancy profile.

In a seventh aspect, alone or in combination with one or more of the first through sixth aspects, communicating on the first bandwidth part includes at least one of: reporting a periodic or semi-persistent channel state information message, forgoing sounding reference signal transmission, forgoing physical random access channel transmission, forgoing scheduling request transmission, forgoing configured grant transmission, or maintaining a timing alignment timer.

In an eighth aspect, alone or in combination with one or more of the first through seventh aspects, the UE is configured to enter a dormancy behavior associated with the dormancy profile for a secondary cell group based at least in part on one of a corresponding primary secondary cell associated with the dormancy behavior, or a corresponding primary secondary cell configured for a connected discontinuous reception (C-DRX) state operation.

In a ninth aspect, alone or in combination with one or more of the first through eighth aspects, a downlink configuration for the primary secondary cell is the same configuration a downlink configuration for the secondary cell group.

In a tenth aspect, alone or in combination with one or more of the first through ninth aspects, an uplink configuration for the primary secondary cell includes at least one of: a configured physical uplink control channel for channel state information reporting or scheduling request transmission, a selectively configured random access channel, or a selectively configured sounding reference signal.

In an eleventh aspect, alone or in combination with one or more of the first through tenth aspects, process 800 includes receiving primary secondary cell activation signaling from a primary cell of a master cell group, and switching from a non-dormancy profile to the dormancy profile for a primary secondary cell based at least in part on the primary secondary cell activation signaling.

In a twelfth aspect, alone or in combination with one or more of the first through eleventh aspects, the primary secondary cell activation signaling is at least one of: a cross-cell group downlink control information for the primary secondary cell, or a cross-cell group downlink control information for secondary cells of a secondary cell group.

In a thirteenth aspect, alone or in combination with one or more of the first through twelfth aspects, process 800 includes receiving a radio resource control reconfiguration message, switching from a non-dormancy profile to the dormancy profile for a primary secondary cell based at least in part on the radio resource control reconfiguration message, and transmitting a response message to the primary secondary cell based at least in part on switching to the dormancy profile.

In a fourteenth aspect, alone or in combination with one or more of the first through thirteenth aspects, the radio resource control reconfiguration message includes an indicator to cause a switch for secondary cells of a secondary cell group associated with the primary secondary cell.

In a fifteenth aspect, alone or in combination with one or more of the first through fourteenth aspects, process 800 includes receiving a cross-carrier downlink control information from the primary secondary cell to cause a dormancy profile switch for secondary cells of a secondary cell group of the primary secondary cell.

In a sixteenth aspect, alone or in combination with one or more of the first through fifteenth aspects, process 800 includes transmitting activation request signaling to activate a primary secondary cell, and the activation request signaling is at least one of: a MAC CE transmitted to a primary cell of a master cell group, a scheduling request transmitted to the primary secondary cell, an inter-node signaling activation request transmitted from a secondary cell group to a primary cell group, a radio resource control (RRC) message transmitted to a primary cell of a master cell group, or a random access channel transmission in the primary secondary cell. In some aspects, the RRC message is a UE assistance information message.

In a seventeenth aspect, alone or in combination with one or more of the first through sixteenth aspects, process 800 includes maintaining a timing alignment of a primary secondary cell during a dormancy mode associated with the dormancy profile based at least in part on a timing alignment adjustment indication, and the timing alignment adjustment indication is at least one of a TAC MAC CE transmitted to a primary cell of a master cell group or a random access channel transmission in the primary secondary cell, a physical uplink control channel secondary cell, or a radio resource control (RRC) message. In some aspects, the RRC message is an RRC reconfiguration message. In some aspects, the TAC MAC CE includes at least one of a TAC for primary secondary cell, a TAC for a physical uplink control channel secondary cell in a secondary cell group, an the identifier of the secondary cell, or an indication of whether the TAC is for the primary secondary cell.

In an eighteenth aspect, alone or in combination with one or more of the first through seventeenth aspects, the timing alignment is determined based at least in part on a periodic or semi-persistent channel state information report in a physical uplink channel configured in an uplink dormancy profile for a primary secondary cell. In some aspects, process 800 includes transmitting another random access channel transmission, monitoring for a random access response (RAR) in the downlink dormancy profile for the primary secondary cell for one duration, and stopping monitoring of the RAR after the one duration expires. In some aspects, the one duration to monitor RAR is configured based at least in part on a radio resource control (RRC) message. In some aspects, the RAR includes at least one of the TAC for primary secondary cell, the TAC for a PUCCH secondary cell in a secondary cell group, an identifier of the secondary cell. In some aspects, the TAC MAC CE is a legacy TAC MAC CE or a dedicated TAC MAC CE. In some aspects, process 800 includes reporting a periodic or semi-persistent channel state information message to PUCCH of primary secondary cell based at least in part on a timing alignment (TA) timer of a physical uplink control channel secondary cell expiring.

In a nineteenth aspect, alone or in combination with one or more of the first through eighteenth aspects, all secondary cells of the secondary cell group are associated with the dormancy behavior.

In a twentieth aspect, alone or in combination with one or more of the first through nineteenth aspects, process 800 may include selectively performing a radio link monitoring procedure.

In a twenty-first aspect, alone or in combination with one or more of the first through twentieth aspects, communicating in accordance with the uplink configuration for the primary secondary cell includes at least one of reporting a periodic or semi-persistent channel state information message, performing a periodic sounding reference signal transmission, performing a physical random access channel transmission, performing a scheduling request transmission, forgoing a configured grant transmission, or maintaining a timing alignment timer.

In a twenty-second aspect, alone or in combination with one or more of the first through twenty-first aspects, a response message is at least one of a radio resource control reconfiguration complete message, or an uplink control indication.

In a twenty-third aspect, alone or in combination with one or more of the first through twenty-second aspects, a MAC CE includes at least an identifier of a primary secondary cell.

In a twenty-fourth aspect, alone or in combination with one or more of the first through twenty-third aspects, a TAC MAC CE includes at least an identifier of a primary secondary cell.

In a twenty-fifth aspect, alone or in combination with one or more of the first through twenty-fourth aspects, process 800 includes transmitting another random access channel transmission to receive the random access channel transmission as a response.

In a twenty-sixth aspect, alone or in combination with one or more of the first through twenty-fifth aspects, the TAC MAC CE is a legacy TAC MAC CE or a dedicated TAC MAC CE.

In a twenty-seventh aspect, alone or in combination with one or more of the first through twenty-sixth aspects, process 800 includes transmitting a preamble or a UE assistance information message to activate a primary secondary cell in connection with the dormancy profile.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving bandwidth part configuration information configuring a dormancy profile for a first bandwidth part of a plurality of bandwidth parts;
   communicating, on a second bandwidth part, a plurality of types of signaling;
   communicating on the first bandwidth part a subset of the plurality of types of signaling, such that at least one type of signaling, of the plurality of types of signaling, is suppressed in accordance with the dormancy profile,
   wherein communicating on the first bandwidth part includes:
       forgoing monitoring of a physical downlink control channel (PDCCH), forgoing semi-persistent scheduling-based communication, forgoing sounding reference signal transmission, forgoing physical random access channel transmission, forgoing scheduling request transmission, or forgoing configured grant transmission; and
       performing radio resource management (RRM) communication, performing channel state information (CSI) communication, performing a beam management procedure, or performing beam failure detection and beam failure recovery.

2. The method of claim 1, further comprising:
   receiving a non-dormancy profile for the first bandwidth part; and
   wherein communicating on the first bandwidth part comprises:
       communicating on the first bandwidth part such that the at least one type of signaling is suppressed at a first time when the dormancy profile is active; and
       communicating on the first bandwidth part such that the at least one type of signaling is not suppressed at a second time when the non-dormancy profile is active.

3. The method of claim 1, wherein the at least one type of signaling is PDCCH signaling; and
   wherein the dormancy profile, with respect to the PDCCH signaling, is at least one:
       not configured for PDCCH signaling, not configured with a control resource set for PDCCH signaling, or not configured with a search space for PDCCH signaling.

4. The method of claim 1, wherein the dormancy profile is a downlink dormancy profile and, with respect to the plurality of types of signaling, the dormancy profile includes at least one of:
   a physical downlink shared channel configuration, a channel state information configuration for at least one secondary cell,
   a beam management configuration for the at least one secondary cell, a radio resource management configuration for the at least one secondary cell, a semi-persistent scheduling configuration for the at least one secondary cell, or
   a beam failure detection and beam failure recovery configuration for the at least one secondary cell.

5. The method of claim 1, wherein the dormancy profile is an uplink dormancy profile and, with respect to the plurality of types of signaling, the dormancy profile includes at least one of:
   a physical uplink control channel (PUCCH) configuration for channel state information reporting in a PUCCH secondary cell, a physical uplink shared channel configuration, a random access channel configuration in a subset of secondary cells, or
   a sounding reference signal configuration at least in the PUCCH secondary cell.

6. The method of claim 1, wherein communicating on the first bandwidth part includes at least one of:
   monitoring, on a primary cell, for a cross-carrier downlink control information indicating a switch from the dormancy profile to a non-dormancy profile, or
   switching to the non-dormancy profile.

7. The method of claim 1, wherein communicating on the first bandwidth part includes:
   maintaining a timing alignment timer.

8. The method of claim 1, wherein the UE is configured to enter a dormancy behavior associated with the dormancy profile for a secondary cell group based at least in part on one of:
   a corresponding primary secondary cell associated with the dormancy behavior, or a corresponding primary secondary cell configured for a connected discontinuous reception (C-DRX) state operation.

9. The method of claim 8, wherein all secondary cells of the secondary cell group are associated with the dormancy behavior.

10. The method of claim 8, wherein a downlink configuration for the primary secondary cell is the same configuration as a downlink configuration for the secondary cell group.

11. The method of claim 10, further comprising:
selectively performing a radio link monitoring procedure.

12. The method of claim 8, wherein an uplink configuration for the primary secondary cell includes at least one of:
a configured physical uplink control channel for channel state information reporting or scheduling request transmission, a selectively configured random access channel, or
a selectively configured sounding reference signal.

13. The method of claim 8, wherein communicating in accordance with an uplink configuration for the primary secondary cell includes at least one of:
reporting a periodic or semi-persistent channel state information message, performing a periodic sounding reference signal transmission,
performing a physical random access channel transmission, performing a scheduling request transmission, forgoing a configured grant transmission, or
maintaining a timing alignment timer.

14. The method of claim 1, further comprising:
receiving primary secondary cell activation signaling from a primary cell of a master cell group; and
switching from a non-dormancy profile to the dormancy profile for a primary secondary cell based at least in part on the primary secondary cell activation signaling.

15. The method of claim 14, wherein the primary secondary cell activation signaling is at least one of:
a cross-cell group downlink control information for the primary secondary cell, or a cross-cell group downlink control information for secondary cells of a secondary cell group.

16. The method of claim 1, further comprising:
receiving a radio resource control reconfiguration message; and
switching from a non-dormancy profile to the dormancy profile for a primary secondary cell based at least in part on the radio resource control reconfiguration message; and
transmitting a response message to the primary secondary cell based at least in part on switching to the dormancy profile.

17. The method of claim 16, where the response message is at least one of:
a radio resource control reconfiguration complete message, or
an uplink control indication.

18. The method of claim 16, wherein the radio resource control reconfiguration message includes an indicator to cause a switch for secondary cells of a secondary cell group associated with the primary secondary cell.

19. The method of claim 16, further comprising:
receiving a cross-carrier downlink control information from the primary secondary cell to cause a dormancy profile switch for secondary cells of a secondary cell group of the primary secondary cell.

20. The method of claim 1, further comprising:
transmitting activation request signaling to activate a primary secondary cell, wherein the activation request signaling is at least one of:
a medium access control (MAC) control element transmitted to a primary cell of a master cell group, a scheduling request transmitted to the primary secondary cell, an inter-node signaling activation request transmitted from a secondary cell group to a primary cell group, a radio resource control (RRC) message transmitted to a primary cell of a master cell group, or
a random access channel transmission in the primary secondary cell.

21. The method of claim 20, wherein the MAC control element includes at least an identifier of the primary secondary cell.

22. The method of claim 20, wherein the RRC message is a UE assistance information message.

23. The method of claim 1, further comprising:
maintaining a timing alignment of a primary secondary cell during a dormancy mode associated with the dormancy profile based at least in part on a timing alignment adjustment indication, wherein the timing alignment adjustment indication is at least one of:
a timing advance command (TAC) medium access control (MAC) control element (CE) transmitted to a primary cell of a master cell group, a random access channel transmission in the primary secondary cell, or
a radio resource control (RRC) message.

24. The method of claim 23, wherein the RRC message is an RRC reconfiguration message.

25. The method of claim 23, wherein the TAC MAC CE includes at least one of:
a TAC for primary secondary cell, a TAC for a physical uplink control channel secondary cell in a secondary cell group, an identifier of the secondary cell. or an indication of whether the TAC is for the primary secondary cell.

26. The method of claim 23, wherein the timing alignment is determined based at least in part on a periodic or semi-persistent channel state information report in a physical uplink channel configured in an uplink dormancy profile for the primary secondary cell.

27. The method of claim 23, further comprising:
transmitting another random access channel transmission;
monitoring for a random access response (RAR) in a downlink dormancy profile for the primary secondary cell for one duration; and
stopping monitoring of the RAR after the one duration expires.

28. The method of claim 27, wherein the one duration to monitor RAR is configured based at least in part on a radio resource control (RRC) message.

29. The method of claim 27, wherein the RAR includes at least one of:
the TAC for the primary secondary cell, or
the TAC for a PUCCH secondary cell in a secondary cell group, or
an identifier of the secondary cell.

30. The method of claim 29, wherein the TAC MAC CE is a legacy TAC MAC CE or a dedicated TAC MAC CE.

31. The method of claim 1, further comprising:
reporting a periodic or semi-persistent channel state information message to PUCCH of primary secondary cell based at least in part on a timing alignment (TA) timer of a physical uplink control channel secondary cell expiring.

32. A user equipment (UE) for wireless communication, comprising:
one or more memories; and
one or more processors operatively coupled to the one or more memories, configured to:

receive bandwidth part configuration information configuring a dormancy profile for a first bandwidth part of a plurality of bandwidth parts;

communicate, on a second bandwidth part, a plurality of types of signaling; and communicate on the first bandwidth part a subset of the plurality of types of signaling, such that at least one type of signaling, of the plurality of types of signaling, is suppressed in accordance with the dormancy profile, wherein communicating on the first bandwidth part includes:

forgoing monitoring of a physical downlink control channel (PDCCH), forgoing semi-persistent scheduling-based communication, forgoing sounding reference signal transmission, forgoing physical random access channel transmission, forgoing scheduling request transmission, or forgoing configured grant transmission; and performing radio resource management (RRM) communication, performing channel state information (CSI) communication, performing a beam management procedure, or performing beam failure detection and beam failure recovery.

33. A non-transitory computer-readable medium storing one or more instructions for wireless communication, the one or more instructions comprising:

one or more instructions that, when executed by one or more processors of a user equipment (UE), cause the one or more processors to:

receive bandwidth part configuration information configuring a dormancy profile for a first bandwidth part of a plurality of bandwidth parts;

communicate, on a second bandwidth part, a plurality of types of signaling; and communicate on the first bandwidth part a subset of the plurality of types of signaling, such that at least one type of signaling, of the plurality of types of signaling, is suppressed in accordance with the dormancy profile, wherein communicating on the first bandwidth part includes:

forgoing monitoring of a physical downlink control channel (PDCCH), forgoing semi-persistent scheduling-based communication, forgoing sounding reference signal transmission, forgoing physical random access channel transmission, forgoing scheduling request transmission, or forgoing configured grant transmission; and performing radio resource management (RRM) communication, performing channel state information (CSI) communication, performing a beam management procedure, or performing beam failure detection and beam failure recovery.

34. An apparatus for wireless communication, comprising:

means for receiving bandwidth part configuration information configuring a dormancy profile for a first bandwidth part of a plurality of bandwidth parts;

means for communicating, on a second bandwidth part, a plurality of types of signaling; and means for communicating on the first bandwidth part a subset of the plurality of types of signaling, such that at least one type of signaling, of the plurality of types of signaling, is suppressed in accordance with the dormancy profile, wherein communicating on the first bandwidth part includes:

forgoing monitoring of a physical downlink control channel (PDCCH), forgoing semi-persistent scheduling-based communication, forgoing sounding reference signal transmission, forgoing physical random access channel transmission, forgoing scheduling request transmission, or forgoing configured grant transmission; and performing radio resource management (RRM) communication, performing channel state information (CSI) communication, performing a beam management procedure, or performing beam failure detection and beam failure recovery.

35. The method of claim 1, further comprising:

receiving a one-bit downlink control information (DCI) that triggers a switch from dormancy behavior to non-dormancy behavior.

* * * * *